(12) United States Patent
Blacker et al.

(10) Patent No.: US 7,867,608 B2
(45) Date of Patent: Jan. 11, 2011

(54) ELECTRICALLY GRADATED CARBON FOAM

(75) Inventors: Jesse M. Blacker, Bridgeport, OH (US);
Janusz W. Plucinski, Glen Dale, WV (US)

(73) Assignee: Touchstone Research Laboratory, Ltd., Triadelphia, WV (US)

( * ) Notice: Subject to any disclaimer, the term of this patent is extended or adjusted under 35 U.S.C. 154(b) by 153 days.

(21) Appl. No.: 11/964,036

(22) Filed: Dec. 25, 2007

(65) Prior Publication Data

US 2008/0299378 A1 Dec. 4, 2008

Related U.S. Application Data

(60) Provisional application No. 60/882,841, filed on Dec. 29, 2006.

(51) Int. Cl.
*B32B 5/14* (2006.01)
*H05B 6/00* (2006.01)

(52) U.S. Cl. ........... 428/310.5; 264/405; 264/29.1; 264/29.7

(58) Field of Classification Search .......... 428/310.5; 264/405, 29.1, 29.7
See application file for complete search history.

(56) References Cited

U.S. PATENT DOCUMENTS

| | | | | |
|---|---|---|---|---|
| 3,302,999 | A | * | 2/1967 | Mitchell et al. ............ 423/448 |
| 3,484,391 | A | * | 12/1969 | Rains et al. ............... 521/181 |
| 4,133,738 | A | * | 1/1979 | Will ........................ 204/294 |
| 4,442,165 | A | * | 4/1984 | Gebhardt et al. ........ 428/307.7 |
| 7,247,368 | B1 | * | 7/2007 | Rogers .................... 428/304.4 |
| 2004/0191632 | A1 | * | 9/2004 | Kelley et al. ............. 429/235 |

* cited by examiner

*Primary Examiner*—Hai Vo
(74) *Attorney, Agent, or Firm*—Philip D. Lane

(57) ABSTRACT

Electrically gradated carbon foam materials that have changing or differing electrical properties through the thickness of the carbon foam material and methods for making these electrically gradated carbon foam materials are described herein. In some embodiments, the electrically gradated carbon foam materials exhibit increasing electrical resistivity through the thickness of the carbon foam material such that the electrical resistivity near a second surface of the carbon foam is at least 2 times greater than the electrical resistivity near a first surface of the carbon foam. These electrically gradated carbon foam materials may be used as radar absorbers, as well as in electromagnetic interference (EMI) shielding schemes.

18 Claims, 4 Drawing Sheets

ELECTRICALLY GRADATED CARBON FOAM

CROSS-REFERENCE TO RELATED APPLICATIONS

This application claims priority to U.S. Provisional Patent Application No. 60/882,841 filed Dec. 29, 2006, which is herein specifically incorporated by reference in its entirety.

STATEMENT REGARDING FEDERALLY SPONSORED RESEARCH OR DEVELOPMENT

This invention was made with Government support under contract number N00014-02-C-0392 awarded by the United States Navy. The Government has certain rights in the invention.

BRIEF SUMMARY OF EMBODIMENTS OF THE INVENTION

In accordance with an embodiment of the invention, a carbon foam material may comprise a carbon foam body comprising a first surface, a second surface, and a thickness of carbon foam between the first surface and the second surface, where the carbon foam body near the second surface exhibits an electrical resistivity at least about 2 times greater than an electrical resistivity near the first surface of the carbon foam body.

In additional embodiments, the electrical resistivity near the second surface of the carbon foam body may be least about 5 times, 10 times, 100 times, or 1,000 greater than the electrical resistivity near the first surface of the carbon foam body. In other embodiments, the electrical resistivity near the second surface of the carbon foam body may range from at least about 2 to about $1E^{+8}$ times greater than the electrical resistivity near the first surface of the carbon foam body. Still further, in some embodiments, the electrical resistivity near the second surface of the carbon foam body may be at least about 10 ohm-cm, 100 ohm-cm, or 1,000 ohm-cm greater than the electrical resistivity near the first surface of the carbon foam body. In some embodiments, the electrical resistivity of the carbon foam body increases through the thickness of the carbon foam body from the first surface to near the second surface. In certain embodiments, the carbon foam may have a density ranging from about 0.05 g/cc to about 1.2 g/cc. Still further, in some embodiments, the thickness of the carbon foam body may be at least about 0.5 inches, and in other embodiments, may range from about 0.5 inches to about 12 inches.

Another embodiment of the invention comprises a method for making an electrically gradated carbon foam material. The method may include the step of providing a carbon foam body comprising a first surface, a second surface, and a thickness of carbon foam between the first surface and the second surface, where the carbon foam body has an initial electrical resistivity. The method may also comprise heating the first surface of the carbon foam body at a temperature and for a time effective to decrease the electrical resistivity near the first surface to a first electrical resistivity, where the electrical resistivity near the second surface is at least 2 times greater than the first electrical resistivity.

Yet another embodiment of the invention may comprise a method for making an electrically gradated carbon foam material. The method may comprise the step of providing a carbon foam body comprising a first surface, a second surface, and a thickness of carbon foam between the first surface and the second surface, where the carbon foam body has an initial electrical resistivity. The method may further comprise heating the first surface of the carbon foam body at a first temperature and for a time effective to decrease the initial electrical resistivity near the first surface to a first electrical resistivity. The method may further comprise the step of heating the second surface of the carbon foam body at a second temperature and for a time effective to decrease the initial electrical resistivity near the second surface to a second electrical resistivity, where the second electrical resistivity near the second surface is at least about 2 times greater that the first electrical resistivity near the first surface. In some embodiments, the electrical resistivity near the second surface of the carbon foam body may be at least about 2 to about $1E^{+8}$ times greater than the first electrical resistivity near the first surface of the carbon foam body. In additional embodiments the steps of heating may be conducted under an inert atmosphere. Still further, in some embodiments, the first temperature and second temperature may be at least about 400 C to about 2,000 C, where the first temperature is greater than the second temperature.

DETAILED DESCRIPTION OF EMBODIMENTS OF THE INVENTION

Electrically gradated carbon foam materials that have changing or differing electrical properties through the thickness of the carbon foam material and methods for making these electrically gradated carbon foam materials are described herein. In some embodiments, the electrically gradated carbon foam materials exhibit increasing electrical resistivity through the thickness of the carbon foam material. These electrically gradated carbon foam materials may be used as radar absorbers, as well as in electromagnetic interference (EMI) shielding schemes.

An electrically gradated carbon foam material includes a carbon foam material that exhibits different electrical resistivity values at or near different surfaces of the carbon foam. For example, with reference to FIG. 1, there is illustrated an electrically gradated carbon foam material 10 in accordance with an embodiment of the invention. The electrically gradated material 10 includes an carbon foam body 12 having a first surface 14 and a second surface 16 spaced a distance from the first surface by a thickness T of carbon foam material. The electrical resistivity of the carbon foam near the first surface 14 is less than the electrical resistivity near the second surface 16.

In some embodiments, the electrical resistivity of the first surface may range from about $1E^{+7}$ ohm-cm (i.e., $1\times10^{+7}$ ohm-cm) to about $1E^{-2}$ ohm-cm. The electrical resistivity near the second surface may take on values ranging from about $1E^{+7}$ ohm-cm to about $1E^{-2}$ ohm-cm; however, the value of the electrical resistivity near the second surface is at least some degree greater than the electrical resistivity near the first surface. In some embodiments, the electrical resistivity near the second surface is least about two times greater than the electrical resistivity near the first surface. In other embodiments, the electrical resistivity near the second surface may be about 5 times, 10 times, 100 times, or 1,000 times greater than the electrical resistivity near the first surface. In some embodiments, the electrical resistivity near the second surface of the carbon foam body is at least about 2 to about $1E^{+8}$ times greater than the electrical resistivity near the first surface of the carbon foam body. In still other embodiments, the difference in electrical resistivity near the first surface and the electrical resistivity near the second surface may range from about $1E^{+1}$ ohm-cm to about $1E^{+8}$ ohm-cm. In certain embodiments, the electrical resistivity increases through the thickness of the carbon foam from the electrical resisitivity near the first surface to the electrical resisitivity near the second surface.

Figure 1:
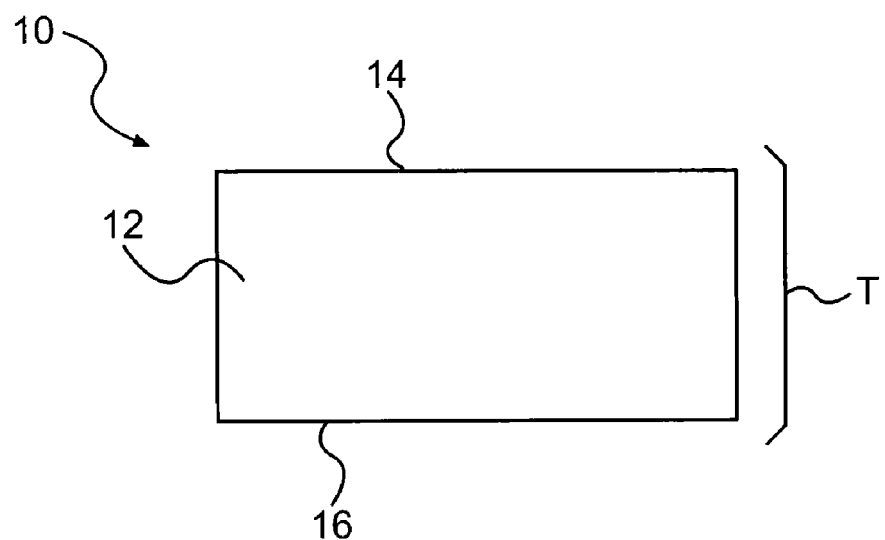
FIG. 1 is a cross-sectional representation of an electrically gradated carbon foam material in accordance with an embodiment of the invention.

The physical parameters of the electrically gradated carbon foam are not particularly limited and may take on a wide variety of dimensions. Electrically gradated carbon foam materials may be made in virtually any geometric pattern or shape and in a variety of sizes. Sizes may include laboratory scale 5"×5" samples or larger panels having the longest dimension of 24", 36", 48", or larger. Further, while FIG. 1 illustrates the first surface and second surface as opposing planar surfaces that are parallel to one another, the first and second surfaces may take on other shapes and configurations so long as there is a thickness of carbon foam material between the first surface and second surface that allows for gradation of electrical resistivity between the first surface and the second surface. The one or more of the surfaces need not be a flat, planar surface and may include curved, wavy, or three dimensional complex shaped surfaces. Further, the surfaces may be angled to one another. The thickness of the electrically gradated carbon foam and the dimension in which electrical gradation occurs may vary. In certain embodiments, the thickness of the electrically gradated carbon foam may range from about ½" to about 2". Some embodiments may have thicknesses of greater than about 2", and may range up to 12" or greater.

In some embodiments, the electrically gradated carbon foam materials may have a density ranging from about 0.05 g/cc to about 1.2 g/cc. In certain embodiments, the carbon foam may have a density ranging from about 0.1 g/cc to about 0.8 g/cc. In various embodiments, the carbon foam may exhibit compressive strengths ranging from about 150 p.s.i. to about 10,000 p.s.i.

Having described the electrically gradated carbon foam material above, methods for producing an electrically gradated carbon foam material will be described. Carbon foams useful for preparing electrically gradated carbon foam materials may include any carbon foam material having an electrical resisitivity value greater than or equal to the desired maximum electrical resisitivity of the final carbon foam product. Carbon foams useful for producing electrically gradated carbon foams may be carbon foams produced using a variety of feedstocks known to those skilled in the art. Carbon foam may be any produced, for example, from pitches, mesophase carbon, mesophase pitches, coal, coal extracts, coal derivatives. Further, carbon foam may also be produced by carbonizing polymeric foams. Such polymeric foams may include, but are not limited to, phenolic foams and resorcinol foams. Other types of polymeric foams may include, but are not limited to, those polymeric foams made from vinylidene chloride, furfuryl alcohol, furan resins, polyacrylonitrile, polyurethane, combinations thereof, or the like. In some embodiments, carbon foam useful for producing electrically gradated carbon foam may include, but are not limited to, CFOAM® 17 or CFOAM® 25 commercially available from Touchstone Research Laboratory, Triadelphia, W. Va.

In some embodiments, the carbon foams useful for producing electrically gradated carbon foams may include, but is not limited to, carbon foams having a density ranging from about 0.05 g/cc to about 1.2 g/cc. In certain embodiments, the carbon foam may have a density ranging from about 0.1 g/cc to about 0.8 g/cc. In various embodiments, the carbon foam may exhibit compressive strengths ranging from about 150 p.s.i. to about 10,000 p.s.i. or greater.

In certain embodiments, the carbon foam used for forming electrically gradated carbon foam may be green carbon foam. In other embodiments, the carbon foam used for forming electrically gradated carbon foam may be calcined carbon foam. As will be discussed below, depending upon the electrical resistivity range desired for the electrical gradation of the carbon foam, any preliminary heat treating of the green or calcined carbon foam should be conducted at temperatures lower than those necessary to produce the desired electrical resistivities for the eventually produced electrically gradated carbon foam.

Figure 2:
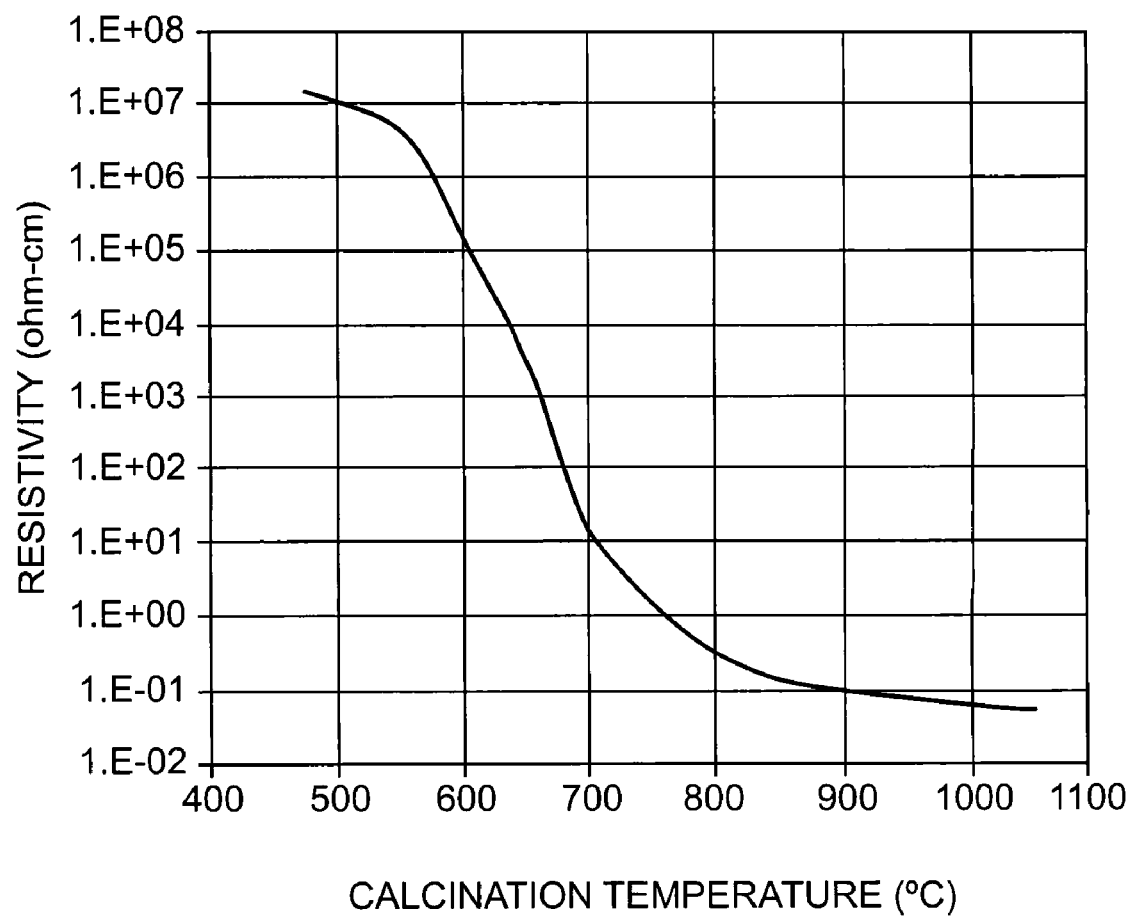
FIG. 2 is a plot of temperature versus electrical resistivity for CFOAM® 17 carbon foam.

The initial carbon foam material may take on a wide range of electrical resistivities depending upon the temperature at which the carbon foam was initially heated during preparation of the carbon foam. In general, as the carbon foam is heated to progressively higher temperatures, the electrical resistivity of the carbon foam decreases. For example, FIG. 2 illustrates the relationship between the electrical resisitivity, as measured at ambient temperature, for CFOAM® 17 carbon foam that has been heated to progressively higher temperatures. As illustrated in FIG. 2, as the heat treatment temperature increases, the electrical resistivity decreases. The specific heat treatment temperature and corresponding electrical resistivity value may differ for different samples of carbon foam but can be determined experimentally for the desired carbon foam sample.

As discussed above, it is important that any preliminary heat treating of the green or calcined carbon foam should be conducted at temperatures lower than those used to produce the desired electrical resistivities for the eventually produced electrically gradated carbon foam.

Once the carbon foam sample is selected and the desired range of electrical resistivities for the electrically gradated carbon foam are determined, electrical gradation of the carbon foam may be achieved by controlling the heat applied to the first surface and a second surface of a sample of carbon foam wherein the first surface and second surface are separated by a thickness of carbon foam material. For example, the first surface may see a final temperature of 900 C, while the second surface may see a final temperature of 500 C. The higher temperature of the first surface produces a lower electrical resistivity than that near the second surface, thus resulting in a through-the-thickness gradation of electrical resistivity.

In accordance with one embodiment, a method for producing an electrically gradated carbon foam material may include providing a carbon foam body having a first surface, a second surface, a thickness of carbon foam between the first surface and the second surface, and an initial electrical resistivity. As discussed above, it is important the carbon foam body have an electrical resistivity that is at least equal to the highest desired electrical resistivity in the resulting electrically gradated carbon foam material. Heat may be applied to the first surface of the carbon foam to reduce the electrical resistivity of the carbon foam near the first surface at a temperature and for a time sufficient to reduce the electrical resistivity of the carbon foam near the first surface to the desired electrical resistivity. The temperature and amount of time may vary from one sample of carbon foam to the next and may depend upon other factors including the thickness between the first surface and the second surface. The amount of time the heat is applied to the first surface should be long enough to reduce the electrical conductivity near the first surface to the desired value but shorter than the time required for second surface to reach the same temperature as that applied to the first surface. As the thickness of the carbon body decreases, the length of time required for heating the first surface decreases. As the thickness of the carbon body increases, the length of time the first surface may be heated may increase. As the first surface is heated for longer times, interior portions of the carbon foam body will begin to heat and reduce the electrical resistivity values through the thickness of the carbon foam.

By varying the times of the heat treatment of the first surface, different electrically gradated samples may be created. For example, shorter heat treatment times of the first surface may produce an electrically gradated carbon foam material in which a majority of the carbon foam thickness has a higher electrical resistivity than the electrical resistivity near the first surface. Alternatively, longer heat treatment times of the first surface may produce an electrically gradated carbon foam material in which a majority of the carbon foam thickness has a lower electrical resistivity than the electrical resistivity near the second surface.

In certain embodiments, the first surface of the carbon foam body is heated to a temperature to reduce the electrical resistivity near the first surface of the carbon foam body to a first electrical resistivity that is at least about half of the initial electrical resistivity or, in other embodiments, at least about half of the electrical resistivity near the second surface. In additional embodiments, the electrical resistivity near the second surface is at least about 2 times greater than the electrical resistivity near the first surface. In further embodiments, other differences in electrical resistivity described above may be created through the thickness of the carbon foam body by varying the initial electrical resistivity of the carbon foam body, varying the temperature for heating the first surface, and varying the time the first surface is heated at the selected temperature.

For many carbon foam materials, the first surface may be heated to temperatures ranging from about 400 C to about 2,000 C. In some embodiments, the first surface may be heated to a temperature ranging from about 500 C to about 900 C. As discussed above, the times for applying the heat to the first surface may vary and can be determined experimentally depending upon factors such as the desired electrical resistivity range, the thickness of the carbon foam body, and the properties of the carbon foam starting material.

An example of forming an electrically gradated material may include providing a CFOAM® 17 carbon foam body having an initial electrical resistivity of about $1E^{+7}$ ohm-cm. Based on the relationship between the treatment temperature of the carbon foam and corresponding electrical resistivity as shown by example in FIG. 2, heating the first surface of the carbon foam body at a temperature of about 700 C will lower the electrical resistivity near the first surface of the carbon foam to about $1E^{+1}$ ohm-cm. Heat will be applied for time sufficient to lower the electrical resistivity at the first surface to the desired electrical resistivity and maintain the electrical resistivity near the second surface of the carbon foam near about $1E^{+7}$ ohm-cm. This particular carbon foam sample, electrical resistivity/temperature profile, temperature ranges and electrical resistivities were chosen for example purposes only. Other carbon foam samples, electrical resistivity/temperature profiles, temperature and electrical resistivity combinations may be utilized.

In other embodiments, heat may be applied to both the first surface and the second surface of the carbon foam body. To create a gradation of electrical resistivities through the thickness of the carbon foam body, the temperature applied to the first surface and the temperature applied to the second surface should be different. As discussed above, initial electrical resistivity of the carbon foam should be above the desired range of electrical resistivities for the electrically gradated carbon foam material. As heat is applied to the first surface and the second surface of the carbon foam body, the electrical resistivities near the first surface and the second surface will begin to decrease. Maintaining a difference in temperature between the first surface and the second surface of the carbon foam body, the electrical resistivity will vary through the thickness of the carbon foam body. The temperature ranges and time parameters discussed above with respect to heating the first surface of the carbon foam body apply to heating the second surface of the carbon foam body. For many carbon foam materials, the first surface and the second surface may be heated to a temperature ranging from about 450 C to about 2,000 C or higher; however, the temperature applied to the first surface of the carbon foam body is different than the temperature applied to the second surface of the carbon foam body. In some embodiments, the difference in temperature applied to first surface of the carbon foam body and the second surface of the carbon foam body may range from about 50 C to about 1500 C.

To apply heat to a surface of the carbon foam, any method that will selectively apply heat at the desired temperature to the selected surface of the carbon foam may be utilized. Heating pads, heat plates, heating elements or other similar devices placed near the surface to be heated may be utilized. A thermocouple near the heated surface may be utilized to monitor the temperature of the surface being heated. A temperature controller may be used to control the heating devices to aid in reaching the selected temperatures and times. In certain embodiments, heating of the carbon foam surfaces is conducted in a non-oxidizing atmosphere such as for example, nitrogen or argon gas. Alternatively, the carbon foam body may be surrounded in a bed of oxygen removal or scavenging material, such as, coke breeze to minimize oxidation around the surfaces of the carbon foam body. The heating elements are typically positioned near or adjacent to the surface of the carbon foam to be heated.

Figure 3:
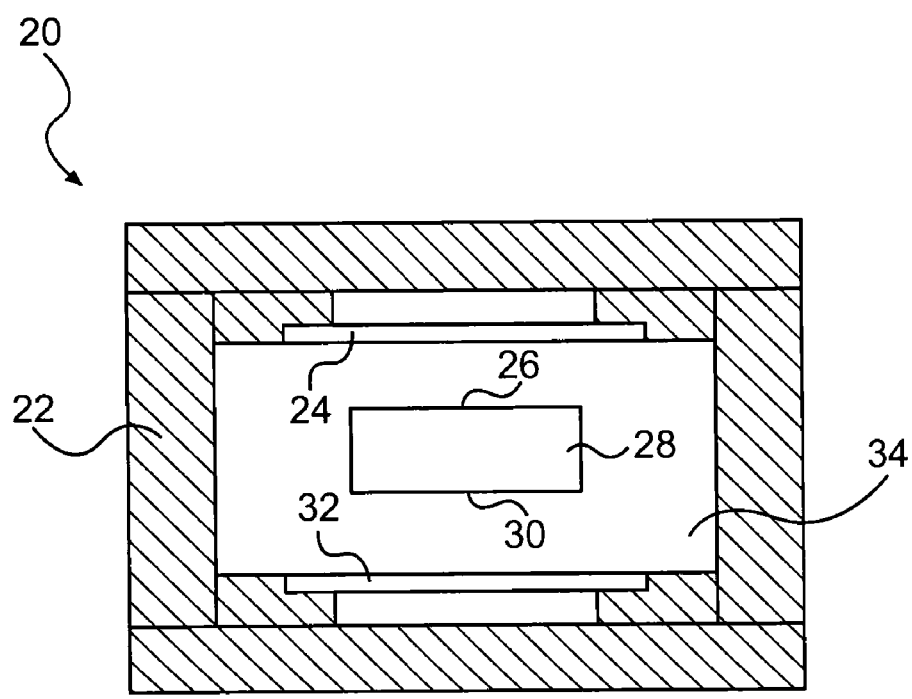
FIG. 3 is a cross-sectional representation of an embodiment of a heating configuration for producing an electrically gradated carbon foam material in accordance with an embodiment of the invention.

With reference to FIG. 3 there is illustrated a heating configuration 20 for producing an electrically gradated carbon foam material. The configuration 20 may include an insulated container or furnace 22 that includes a first heater 24 for heating the first surface 26 of the carbon foam body 28 and a second heater 30 for heating the second surface 32 of the carbon foam body. The first heater and the second heater are capable of being independently controlled from each other. The carbon foam body is placed in an inert environment. In the embodiment of FIG. 3, the carbon foam body is placed in a bed of coke breeze 34 that reduces oxidation and provides a flexible media for the carbon foam to unevenly shrink in during heat treatment. The hatched areas in represent insulation that prevents heat losses from the system. A stainless steel vessel may be used to surround the components.

The following example is provided to illustrate certain aspects of an embodiment of the invention.

Example

Figure 4:
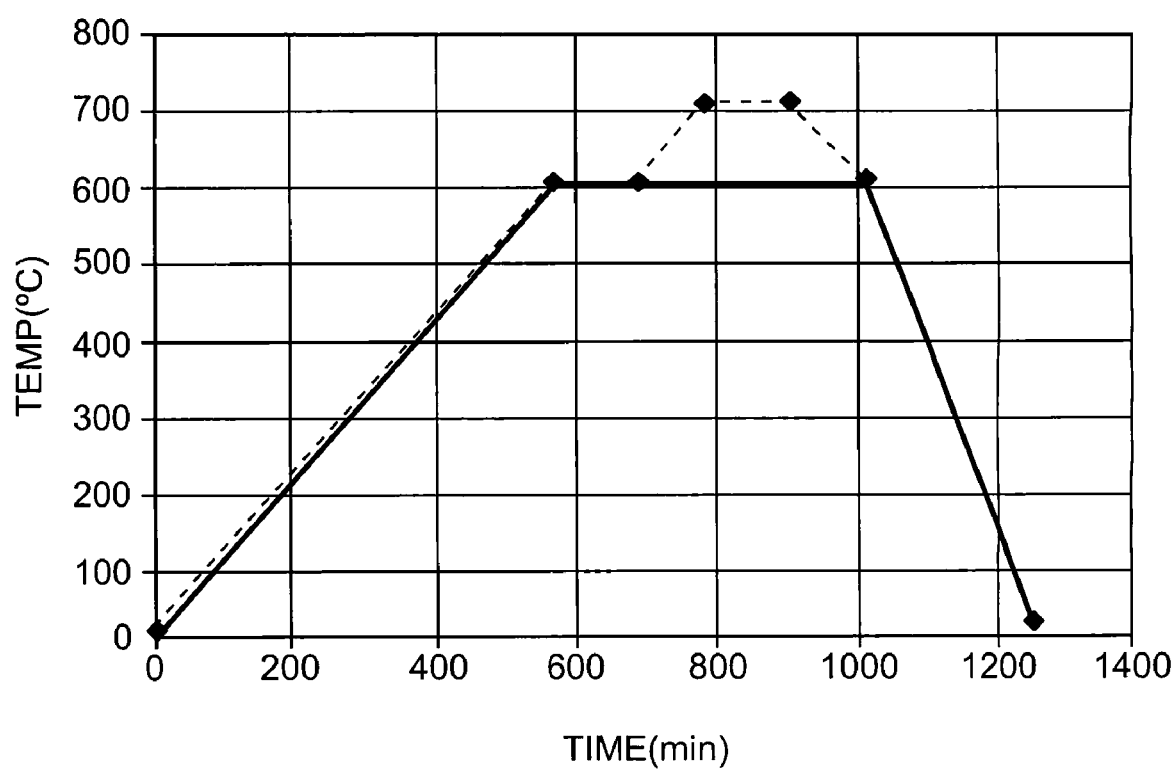
FIG. 4 is a plot of a heating profile in accordance with an embodiment of the present invention.
Figure 5:
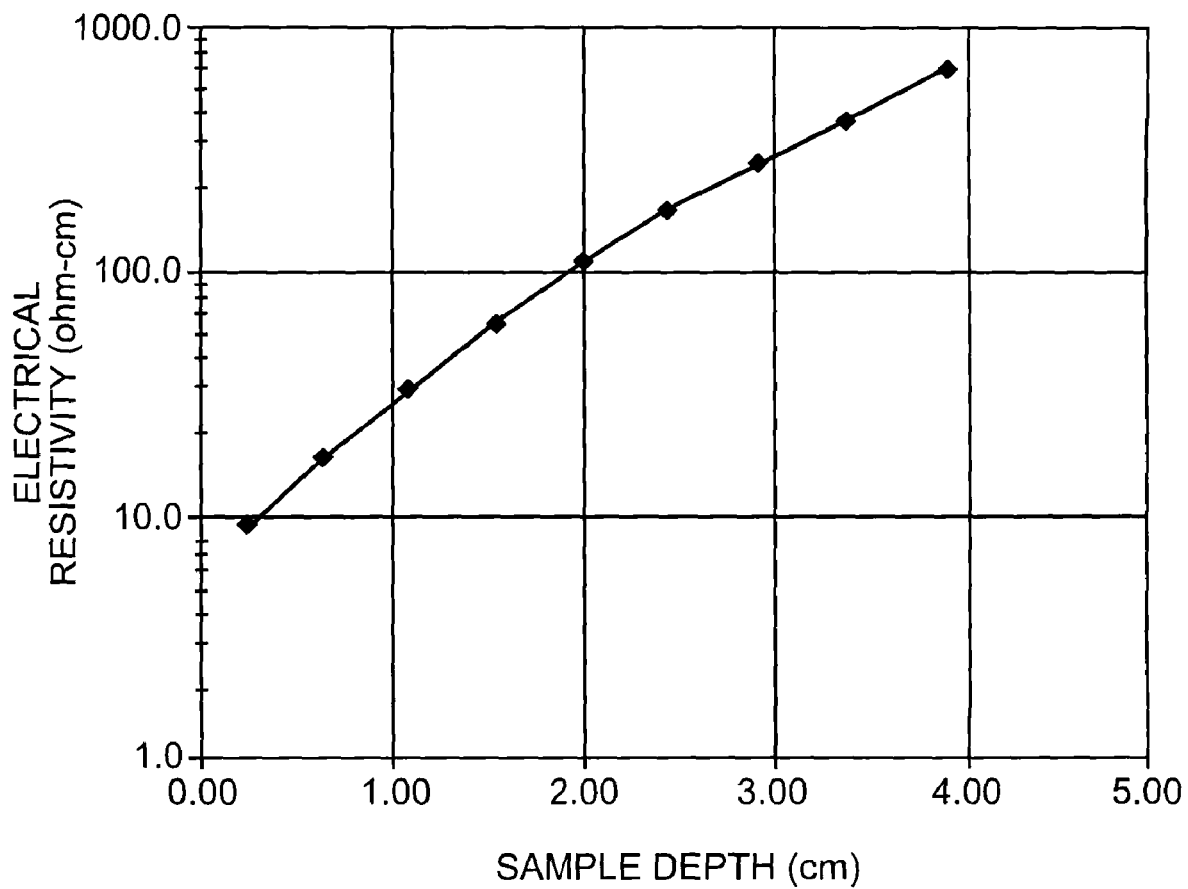
FIG. 5 is a plot of sample depth versus electrical resistivity through the thickness of the carbon foam body of Example 1.

A 5 inch×5 inch×2 inch thick carbon foam body having a density of about 17 lbs/ft³ was placed in a coke breeze within an insulated furnace. A first heater was placed near the first surface of the carbon foam body and a second heater was placed near the second surface of the carbon foam body as illustrated in FIG. 4. The carbon foam body was heated in accordance with the heating profile illustrated in FIG. 4. The heating profile for the first heater is illustrated in dashed lines and the heating profile for the second heater is illustrated in solid lines. As illustrated in this particular profile, the carbon foam body is heated to a temperature of about 600 C. The first heater increases the temperature of the first surface to about 700 C while the second heater maintains the temperature of the second surface near 600 C. The gradated electrical resistivity through the thickness of the carbon foam body is illustrated in FIG. 5. The resulting electrically gradated carbon foam provided an electrical resistivity ranging from about 10 ohm-cm near the first surface to about 800 ohm-cm near the second surface.

As the invention has been described, it will be apparent to those skilled in the art that the invention may be varied in many ways without departing from the spirit and scope of the invention. Any and all such modifications are intended to be included within the scope of the appended claims.

What is claimed is:

1. A carbon foam material comprising a carbon foam body comprising a first surface, a second surface, and a thickness of carbon foam between the first surface and the second surface, wherein carbon foam of the carbon foam body near the second surface exhibits an electrical resistivity at least about 2 times greater than an electrical resistivity of the carbon foam of the carbon foam body near the first surface.

2. The carbon foam material of claim 1, wherein the electrical resistivity near the second surface of the carbon foam body is at least about 5 times greater than the electrical resistivity near the first surface of the carbon foam body.

3. The carbon foam material of claim 1, wherein the electrical resistivity near the second surface of the carbon foam body is at least about 10 times greater than the electrical resistivity near the first surface of the carbon foam body.

4. The carbon foam material of claim 1, wherein the electrical resistivity near the second surface of the carbon foam body is at least about 100 times greater than the electrical resistivity near the first surface of the carbon foam body.

5. The carbon foam material of claim 1, wherein the electrical resistivity near the second surface of the carbon foam body is at least about 1,000 times greater than the electrical resistivity near the first surface of the carbon foam body.

6. The carbon foam material of claim 1, wherein the electrical resistivity near the second surface of the carbon foam body is at least about 2 to about $1E^{+8}$ times greater than the electrical resistivity near the first surface of the carbon foam body.

7. The carbon foam material of claim 1, wherein the electrical resistivity near the second surface of the carbon foam body is at least about 10 ohm-cm greater than the electrical resistivity near the first surface of the carbon foam body.

8. The carbon foam material of claim 1, wherein the electrical resistivity near the second surface of the carbon foam body is at least about 100 ohm-cm greater than the electrical resistivity near the first surface of the carbon foam body.

9. The carbon foam material of claim 1, wherein the electrical resistivity near the second surface of the carbon foam body is at least about 1,000 ohm-cm greater than the electrical resistivity near the first surface of the carbon foam body.

10. The carbon foam material of claim 1, wherein the electrical resistivity of the carbon foam body increases through the thickness of the carbon foam body from the first surface to near the second surface.

11. The carbon foam material of claim 1, wherein the carbon foam has a density ranging from about 0.05 g/cc to about 1.2 g/cc.

12. The carbon foam material of claim 1, wherein the thickness is at least about 0.5 inches.

13. The carbon foam material of claim 1, wherein the thickness ranges from about 0.5 inches to about 12 inches.

14. A method for making an electrically gradated carbon foam material, comprising the steps of:
   providing a carbon foam body comprising a first surface, a second surface, and a thickness of carbon foam between the first surface and the second surface, wherein the carbon foam body has an initial electrical resistivity; and
   heating the first surface of the carbon foam body at a temperature and for a time effective to decrease the electrical resistivity near the first surface to a first electrical resistivity, wherein the electrical resistivity near the second surface is at least 2 times greater than the first electrical resistivity.

15. A method for making an electrically gradated carbon foam material, comprising the steps of:
   providing a carbon foam body comprising a first surface, a second surface, and a thickness of carbon foam between the first surface and the second surface, wherein the carbon foam body has an initial electrical resistivity;
   heating the first surface of the carbon foam body at a first temperature and for a time effective to decrease the initial electrical resistivity near the first surface to a first electrical resistivity; and
   heating the second surface of the carbon foam body at a second temperature and for a time effective to decrease the initial electrical resistivity near the second surface to a second electrical resistivity, wherein the second electrical resistivity near the second surface is at least about 2 times greater that the first electrical resistivity near the first surface.

16. The carbon foam material of claim 15, wherein the electrical resistivity near the second surface of the carbon foam body is at least about 2 to about $1E^{+8}$ times greater than the first electrical resistivity near the first surface of the carbon foam body.

17. The method of claim 15, wherein the steps of heating are conducted under an inert atmosphere.

18. The method of claim 15, wherein the first temperature and second temperature are at least about 400° C. to about 2000° C., and wherein the first temperature is greater than the second temperature.

* * * * *